(12) United States Patent
Sporrer et al.

(10) Patent No.: US 6,283,235 B1
(45) Date of Patent: Sep. 4, 2001

(54) ZERO TURN TRANSAXLE

(75) Inventors: Ronald Sporrer; Raymond Hauser, both of Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 09/650,298

(22) Filed: Aug. 29, 2000

Related U.S. Application Data

(63) Continuation of application No. 08/900,969, filed on Jul. 25, 1997, now Pat. No. 6,152,247.

(51) Int. Cl.[7] .................................................. B62D 11/00
(52) U.S. Cl. ............................................................ 180/6.28
(58) Field of Search .................................. 180/6.48, 291, 180/340, 348, 358, 337, 343, 344, 346, 371, 376, 370; 74/655 S, 655 T, 164, 153, 606 R; 475/74

(56) References Cited

U.S. PATENT DOCUMENTS 5,860,884 * 1/1999 Jolliff ...................................... 475/89
6,010,423 * 1/2000 Jolliff ...................................... 475/93

* cited by examiner

*Primary Examiner*—Robert J. Oberleitner
*Assistant Examiner*—C. T. Bartz
(74) *Attorney, Agent, or Firm*—Thomas C. McDonough; Gary R. Jarosik; John E. Hyatt

(57) ABSTRACT

A hydrostatic zero turn transaxle is provided with two transmission housings, wherein the housings and the output axle for the hydrostatic transmission can be easily adapted to be use for left-hand or right-hand drive, without the need for changing the casing or any of the internal gearing. Such housing may be used to improve tracking efficiency in a zero turn vehicle. Another feature of the invention comprises the arrangement of axles and shafts relative to one another. A further feature of the invention is an improved parking brake feature comprising a brake shaft forming part of the output gear train and means for securing said brake shaft when the gear train is stopped to prevent movement of the gear train and the vehicle.

21 Claims, 7 Drawing Sheets

ZERO TURN TRANSAXLE

CROSS REFERENCE TO RELATED APPLICATIONS

This application is Continuation of U.S. patent application Ser. No. 08/900,969, filed Jul. 25, 1997, now issued as U.S. Pat. No. 6,152,247 issued Nov. 28, 2000. Accordingly, this application claims the benefit of an earlier filing date under 35 U.S.C. §120. The disclosure of U.S. patent application Ser. No. 08/900,969 is incorporated herein by reference.

BACKGROUND OF THE INVENTION

This invention relates generally to zero turn transaxles and, more specifically, relates to an integrated zero turn hydrostatic transaxle. Zero turn transaxles are known in the art and provide for independent control of each of the drive wheels of the vehicle with which such transaxles are utilized. An example of one such transaxle may be found in U.S. Pat. No. 5,078,222 to Hauser et al. entitled "Zero Turn Transaxle" which issued on Jan. 7, 1992. Specifically, the '222 patent discloses a zero turn transmission having two identical mirror image reduction drives powered by independent self-contained hydraulic power units. Additionally, Eaton has developed and marketed zero turn transaxles as their Eaton Models 771 and 781. The Eaton Model 771 is an assembly with one pump and one motor where two mirror image Eaton Model 771 assemblies, a right and a left, are required for zero turn drive. The Eaton Model 781 consists of two units similar to the Eaton Model 771 joined together to make one assembly.

While the known zero turn transaxles work for their intended purpose, they do suffer from some deficiencies which it is the object of the subject invention to overcome. For example, implementing a zero turn drive is seen to be relatively costly owing to the requirement that two separate and distinct mirror image transaxles are needed which transaxles require individualized construction. Additionally, the currently utilized housings in which the transaxle components are carried are seen to undesirably add to the cost and time of manufacture in that they are constructed from at least two main housing sections joined along a seam or split line. Specifically, the use of at least two main housing sections requires relatively tighter tolerances in the manufacture of the housings in that each housing section must properly align to ensure that the components encased therein are properly supported and capable of operating without binding. Furthermore, the use of two non-similarly oriented transaxles to effectuate zero turn drive is seen to cause the tracking efficiency of the two drive wheels to vary with respect to one another since transaxles having non-identical construction and orientation will experience different operating conditions (e.g., different biasing, tolerances, design variances, etc.). In addition, currently utilized zero turn transaxles have been seen to have a relatively large footprint which undesirably increases the wheel base when used to implement zero turn drive and which also places a limit on the size of the vehicle with which the transaxles may be used. From the foregoing, it is seen that a need exists for an improved zero turn transaxle.

SUMMARY OF THE INVENTION

Accordingly, it is a general object of the present invention to provide a zero turn transaxle which may be manufactured at a relative cost savings. It is a more specific object of the present invention to provide an unhanded zero turn transaxle wherein the same transaxle may be utilized for both left handed and right handed drive. It is a further object of the present invention to provide a zero turn transaxle in which, when used as a pair to implement zero turn drive, the left handed and right handed drive track similarly. Another object of the present invention is to provide a transaxle having a seamless main housing section. A further object of the present invention is to provide a zero turn drive having a relatively smaller wheel base and a transaxle having a relatively smaller footprint, and an improved parking brake mechanism.

Other objects and advantages of the present invention will be apparent to those of skill in the art from the teachings herein.

In accordance with objectives of the invention, a zero turn transaxle is provided where both of the transmission units are identical in construction, with the output drive shaft for the vehicle axle being adaptable to be modified for either left drive or right drive.

An improved parking brake mechanism as part of the gear train of the transmission is also incorporated in the present invention.

Advantageous axle and shaft arrangements are also taught herein.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

The attached drawings, which are described briefly below, illustrate exemplary embodiments of the invention. For clarity, in some drawings only enough of an exemplary embodiment is depicted to enable one of skill in the art to practice embodiments of the invention without undue experimentation.

DETAILED DESCRIPTION OF THE DRAWINGS

Figure 1:
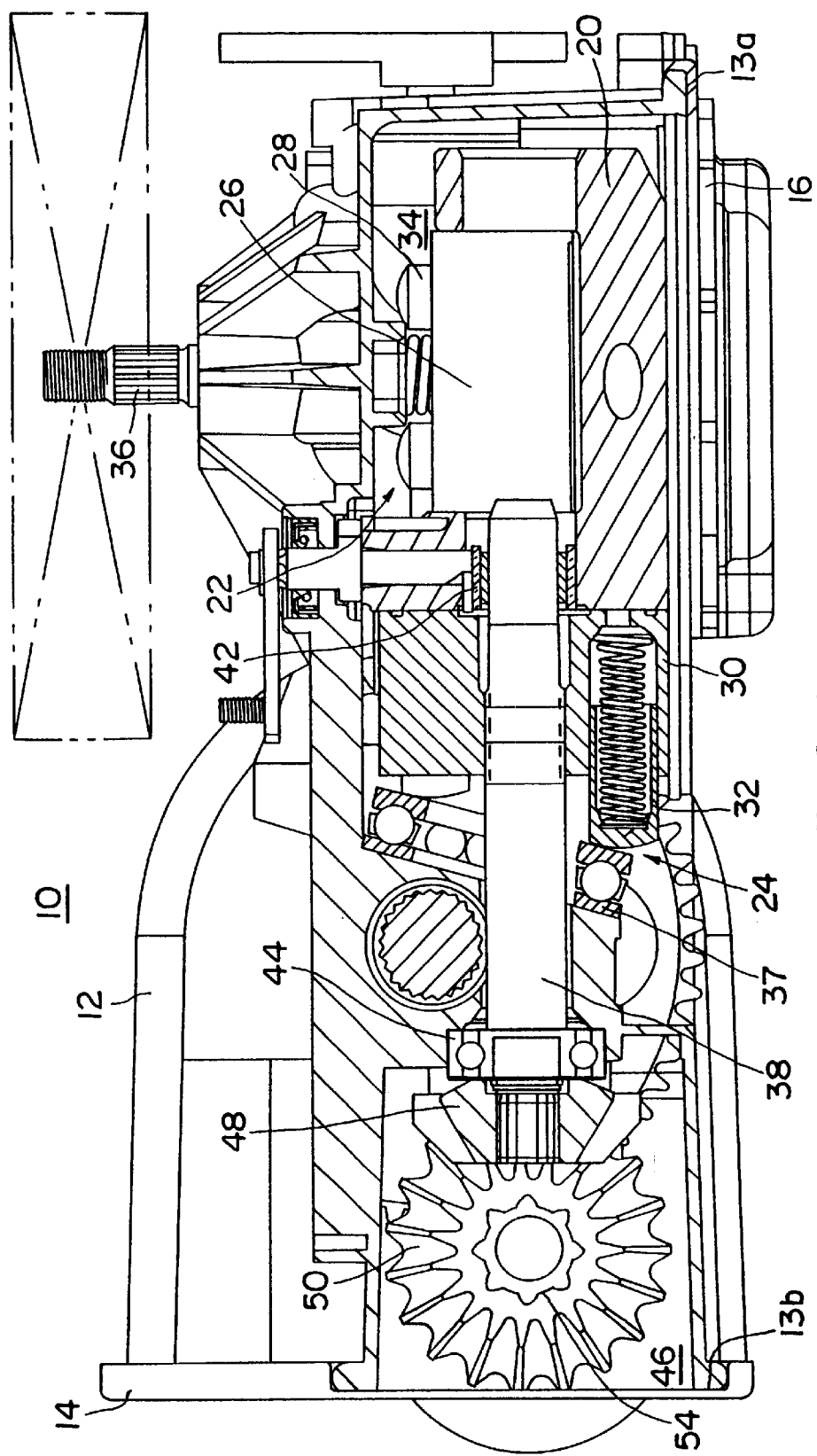
FIG. 1 illustrates a side, partial sectional view of an embodiment of an integrated hydrostatic transaxle ("IHT") constructed in accordance with the present invention.

While the invention may be adapted for use in connection with other types of transmissions and transaxles, it will be described hereinafter in the context of an integrated hydrostatic transaxle ("IHT") as the preferred embodiment thereof.

Referring now to the figures, wherein like reference numerals refer to like elements, there is shown in the figures an IHT 10. While a brief description of the general construction and operation of the IHT will follow, the reader is referred to U.S. Pat. Nos. 5,201,692 and 5,314,387, which patents are hereby incorporated by reference in their entirety, for a more thorough discussion of this subject matter.

As illustrated, the IHT 10 includes a casing comprised of a seamless, main casing section 12, a first cap or cover 14, and a second cap or cover 16. More specifically, the main casing section 12 has a first opening and a second opening wherein the first cap 14 is disposed over the first opening and the second cap 16 is disposed over the second opening. While the embodiment of the invention illustrated shows the first cap 14 and second cap 16 being adapted for snap fit engagement with the main casing section 12, it will be understood that the first cap 14, second cap 16, and main casing section 12 may also be adapted to accept standard fasteners for use in placing the casing components into engagement. In either the fastener or fastenerless embodiments, the casing is provided with a substantially horizontal junction line 13a formed by the junction of the main casing section 12 with the second cap 16 and a substantially vertical junction line 13b formed by the junction of the main casing section 12 with the first cap 14.

The IHT 10 further includes a hydrostatic transmission disposed within the hydraulic chamber 34 of the main casing section 12 which may be described as being housed entirely within the main casing section 12 and covered by the second cap 16. The hydrostatic transmission comprises a center section 20 having hydraulic porting formed therein on which are mounted a hydraulic pump unit 22 and a hydraulic motor unit 24. The hydraulic pump unit 22 is hydraulically connected to the hydraulic motor unit 24 through the hydraulic porting formed in the center section 20 to form what is referred to as a hydraulic circuit. The hydraulic pump unit 22 further includes a pump cylinder block 26 having a plurality of piston receiving chambers formed therein in each of which is disposed a movable pump piston 28. Similarly, the hydraulic motor unit 24 includes a motor cylinder block 30 having a plurality of piston receiving chambers formed therein in each of which is disposed a movable motor piston 32.

An input shaft 36, which is driven by the engine of the vehicle (not shown), is drivingly connected to the hydraulic pump unit 22 such that the rotation of the input shaft 36 rotates the pump cylinder block 26 therewith. The rotation of the pump cylinder block 26 causes the pump pistons 28 to travel up and down as they travel against a movable swash plate. As will be understood by those skilled in the art, the swash plate may be moved to a variety of positions to vary the stroke of the pump pistons 28. In particular, as the stroke of the pump pistons 28 is varied, the volume of the hydraulic fluid pumped into the hydraulic porting will vary. Since the speed of the hydraulic motor unit 24 is dependent upon the amount of hydraulic fluid pumped thereinto by the hydraulic pump unit 22, the positioning of the swash plate is seen to control the speed of the hydraulic motor unit 24. More specifically, each of the motor pistons 32 is driven by the pumped hydraulic fluid against a fixed, angularly orientated motor thrust bearing 37 such that the action of the motor pistons 32 thereagainst forces the motor cylinder block 30 to rotate.

Figure 2:
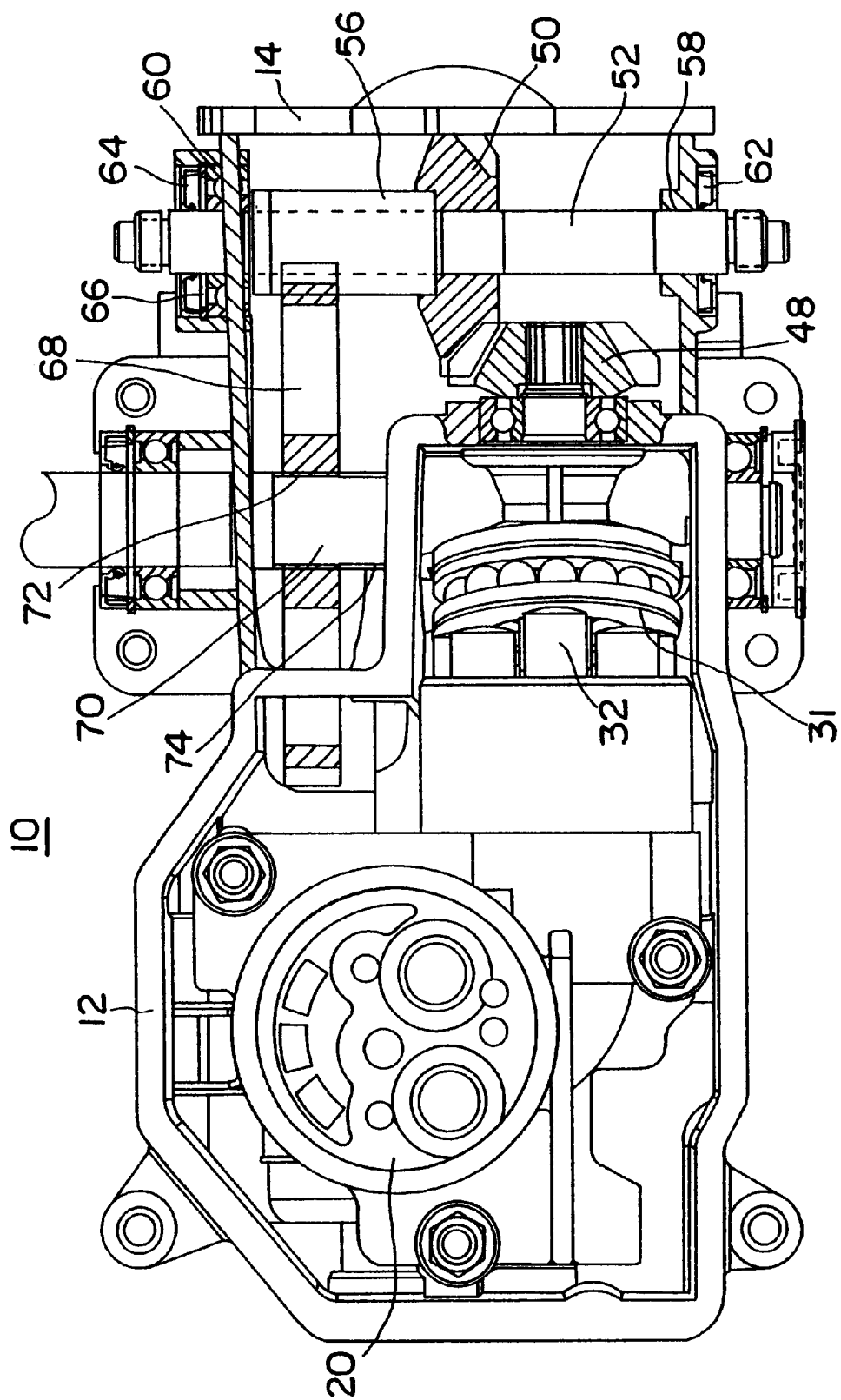
FIG. 2 illustrates a bottom, sectional view of the IHT shown in FIG. 1.

Drivingly connected to the motor cylinder block 30 is a motor shaft 38 which is arranged and adapted to rotate therewith. In particular, the motor shaft extends into the mechanical chamber 46 of the main casing section 12 which may be described as being housed entirely within the main casing section 12 and covered by the first cap 14. The motor shaft 38 is carried at its proximate end on a bearing 42 associated with the center section 20 and at its distal end on a bearing 44 associated with the main casing section 12. A first bevel drive gear 48 is drivingly connected to the distal end of the motor shaft 38. The first bevel drive gear 48 is, in turn, drivingly connected to a second bevel drive gear 50 which is drivingly mounted on a brake shaft 52. More specifically, as illustrated in FIGS. 1 and 2, the inner portion of one end of the second bevel drive gear 50 is provided with gear teeth 54 which are adapted to mate with gear teeth 56 formed on the brake shaft 52. As illustrated, additional hardware need not be used to retain the bevel gears 48, 50 on the respective shafts as the gear separating forces between the first bevel drive gear 48 and the second bevel drive gear 50 function to maintain the position of the bevel gears 48,50 thereon and their mating engagement. In the preferred embodiment of the subject invention, the second bevel drive gear 50 functions as a reduction gear.

The brake shaft 52, on which the second bevel drive gear 50 is mounted, is preferably carried by the first casing section 12. In particular, the first casing section 12 is provided with a first pair of oppositely disposed apertures through which first and second ends of the brake shaft 52 preferably extend. The first aperture has a surface 58 which directly supports the first end of the brake shaft 52. Meanwhile, a bearing 60 is positioned within the second aperture for supporting the second end of the brake shaft 52. A second bearing is not required within the first aperture owing to the reduced loading experienced by the first end of the brake shaft 52. A first seal 62 is positioned within the first aperture about the first end of the brake shaft 52 while a second seal 64 is positioned in the second aperture, over a retaining ring 66, about the second end of the brake shaft 52.

Figure 6:
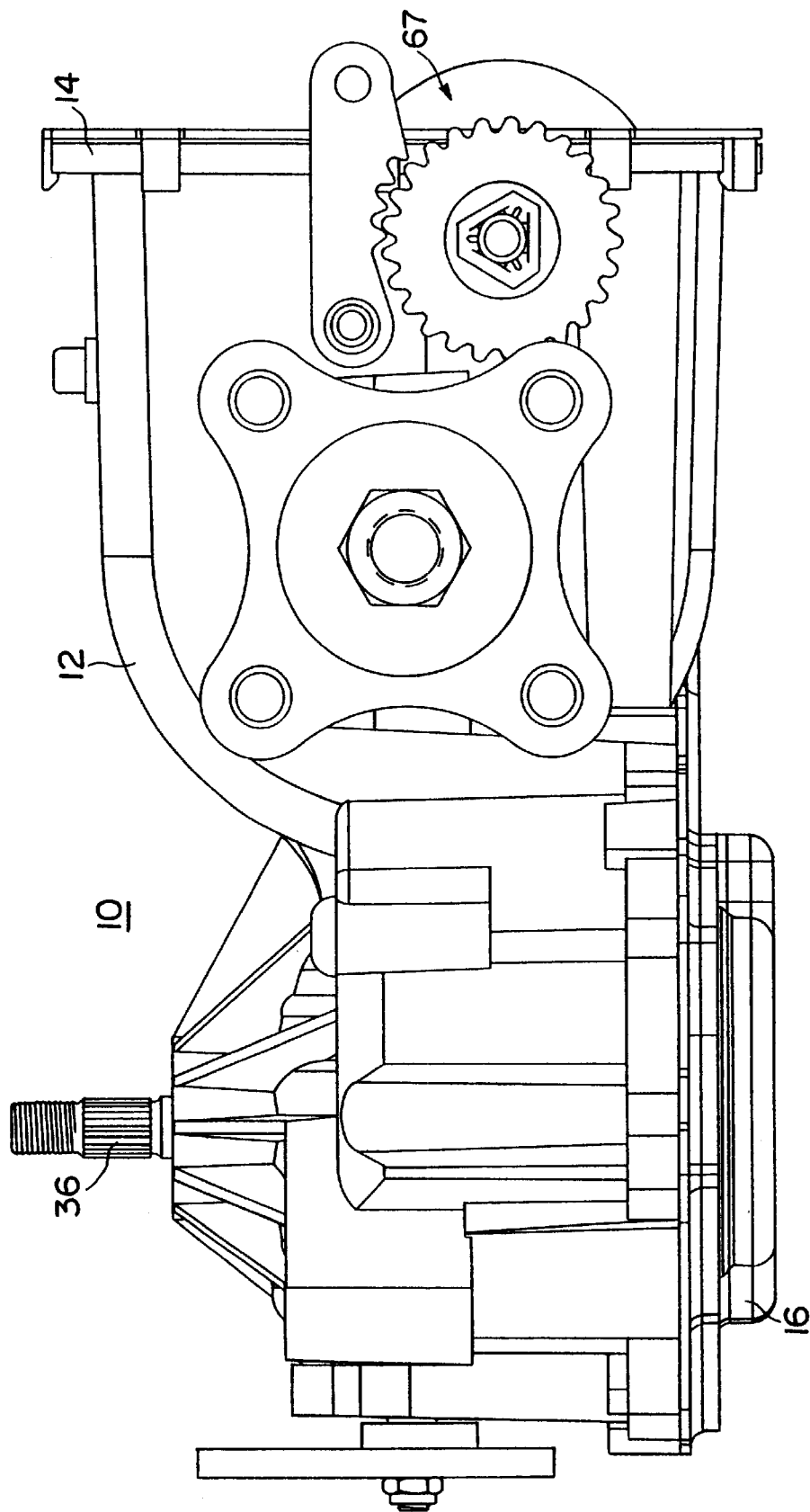
FIG. 6 illustrates a side view of the IHT illustrated in FIG. 1.

As shown in FIG. 6, a parking brake mechanism 67, positioned for engagement with one or both of the externally disposed first and second ends of the brake shaft 52, may be provided to prevent movement of the vehicle. The parking brake shaft 52 shown in FIG. 6 includes brake shaft cogs 52a and the brake mechanism 67 comprises a cogged interface 67a including a cogged brake arm 67b and the brake shaft cogs 52a. Engagement of parking brake mechanism 67, which can only be performed when the vehicle is completely stopped, will prevent the rotation of the brake shaft 52 and the gear train engaged therewith, effectively preventing movement of the vehicle. In the preferred embodiment shown, there is no other braking mechanism other than the hydraulic braking inherent in an HST. This unique use of brake shaft 52 to prevent rotation of the gear train prevents the parking brake feature from being overridden by the transmission after it is engaged.

A bull gear 68 is further drivingly connected to the gear teeth 56 of the brake shaft 52 which is, in turn, drivingly connected to a reversibly positionable axle shaft 70. In particular, the bull gear 68 is floatingly positioned over the axle shaft 70 and is provided with gear teeth or splines 72 around its inner circumference which are adapted to drivingly mate with gear teeth or splines 74 formed on the axle shaft 70. Preferably, the distal portion 68a of the bull gear 68 is inwardly tapered to prevent the binding of the bull gear 68 against the neighboring walls of the main casing section 12 should the floating nature of the bull gear 68 place the bull gear 68 into engagement therewith. As will be described, the gear teeth 74 formed on the axle shaft 70 in cooperation with a second pair of oppositely disposed apertures formed in the main casing section 12 allow the axle shaft 70 to be reversibly positioned for either a left handed or right handed drive.

Figure 4:
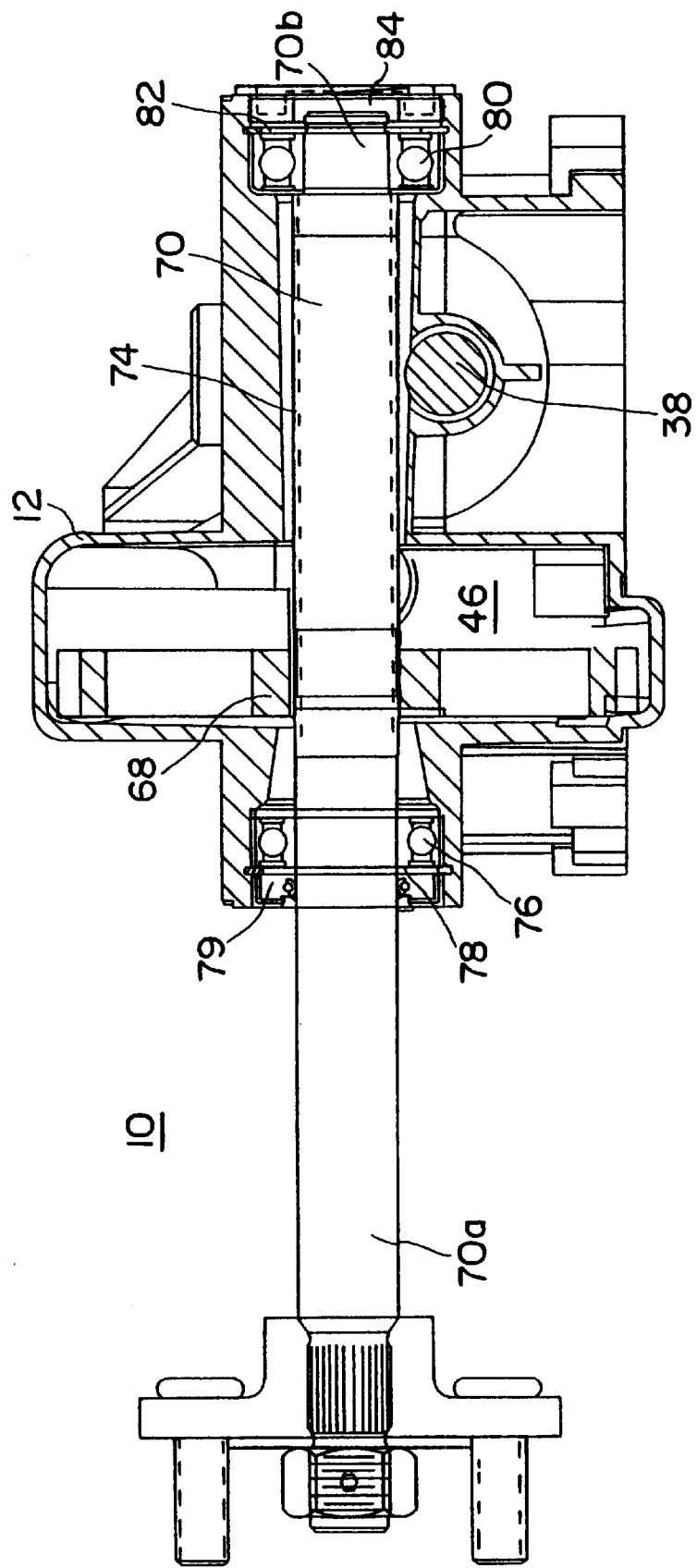
FIG. 4 illustrates a back, sectional view of the IHT shown in FIG. 1, wherein the axle shaft is reversed from the position shown in FIG. 3.
Figure 5:
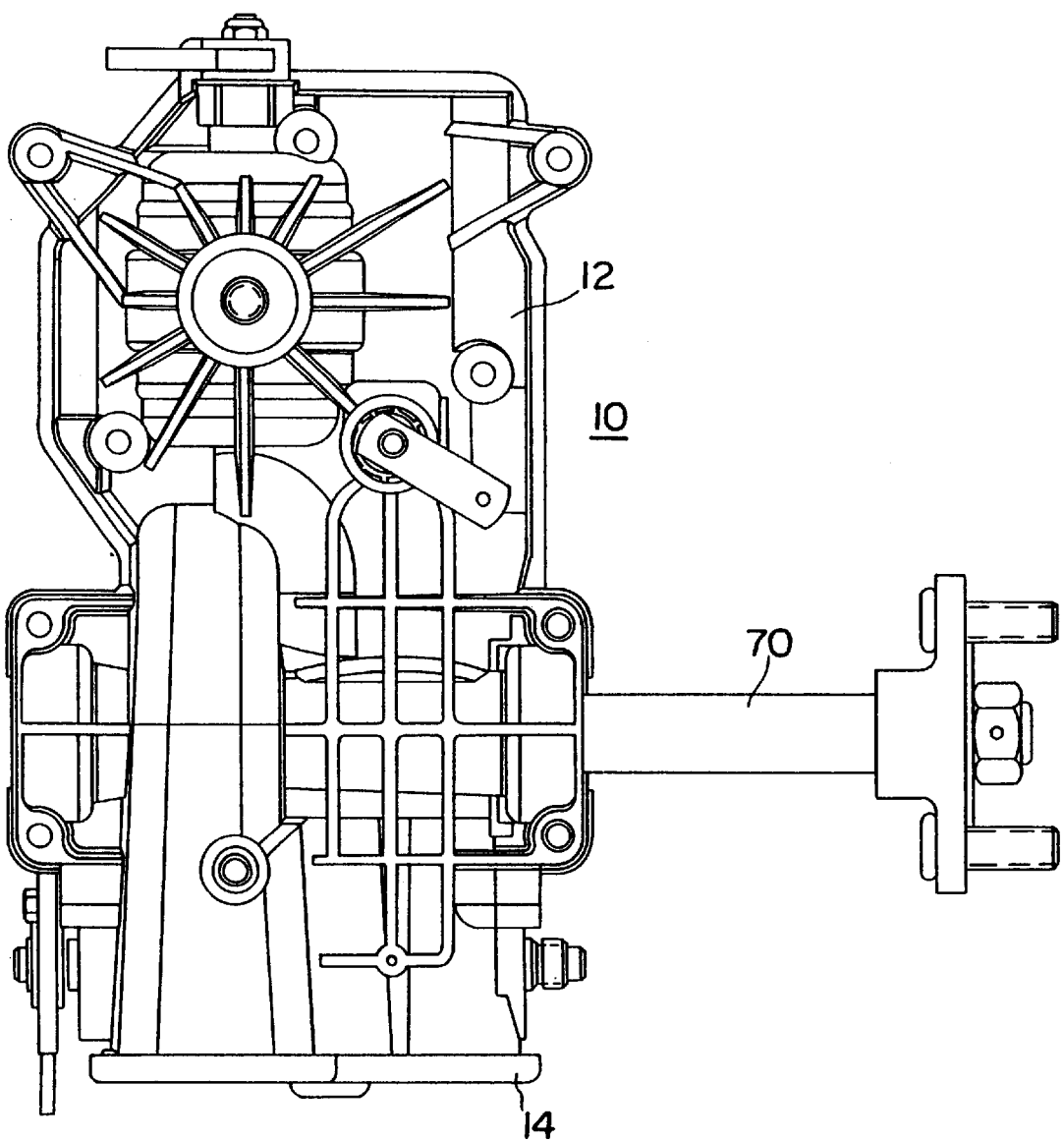
FIG. 5 illustrates a top view of the IHT illustrated in FIG. 2.

For left handed drive, best seen in FIG. 4, the distal end 70a of the axle shaft 70 extends from a third aperture formed in the main casing section 12 while the interior end 70b of the axle shaft 70 is positioned within a fourth aperture. More specifically, the third aperture has positioned therein a bearing 76 which supports the axle shaft 70, a retaining ring 78, and a seal 79 positioned around the axle shaft 70 through which the axle shaft 70 extends. Meanwhile, the fourth aperture similarly has positioned therein a bearing 80 which supports the interior end 70b of the axle shaft 70, a retaining ring 82, and a seal 84 which is adapted to cover the interior end 70b of the axle shaft 70.

Figure 3:
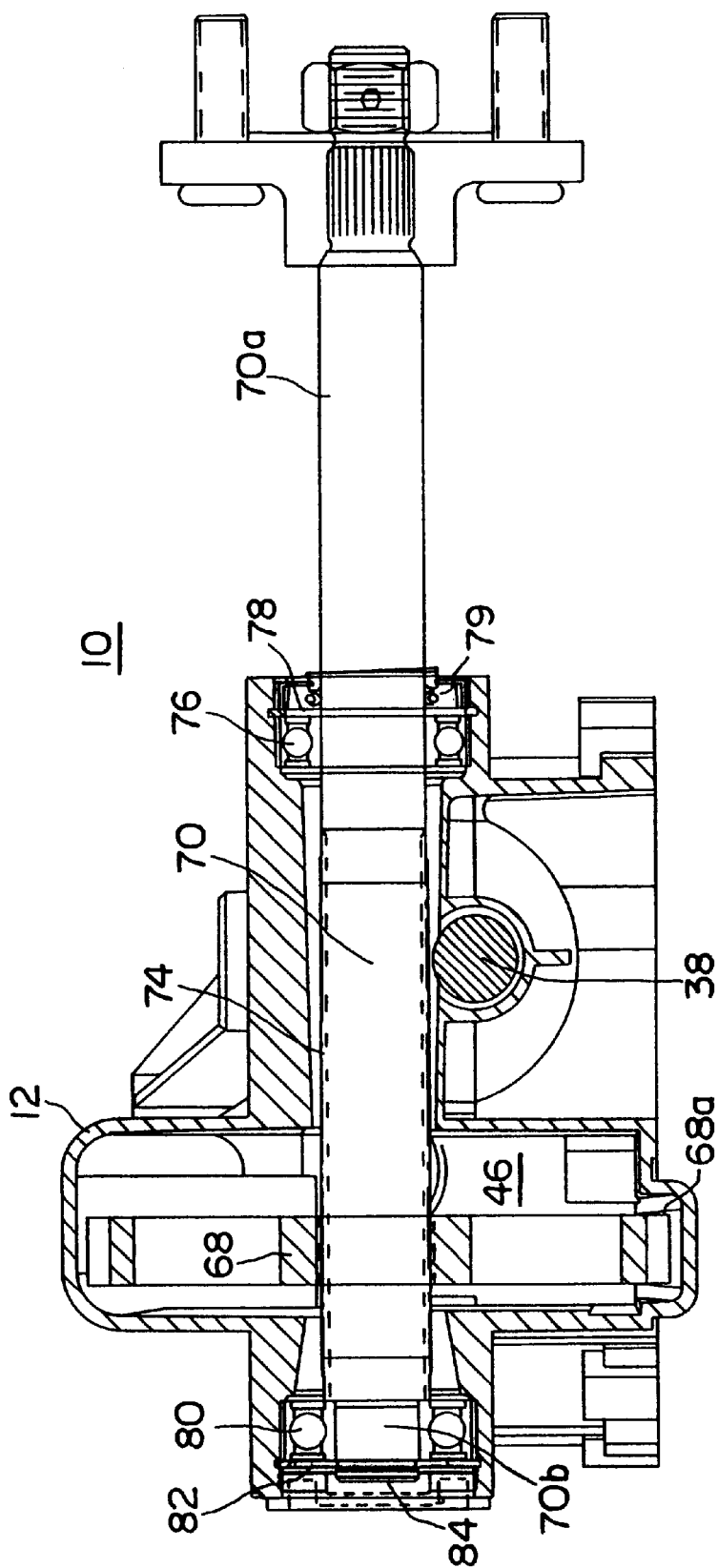
FIG. 3 illustrates a back, sectional view of the IHT shown in FIG. 1 with an axle shaft in a first position.

For right handed drive, best seen in FIG. 3, the distal end 70a of the axle shaft 70 extends from the fourth aperture formed in the main casing section 12 while the interior end 70b of the axle shaft 70 is positioned within the third aperture. More specifically, the fourth aperture has positioned therein the bearing 76 which supports the axle shaft 70, the retaining ring 78, and the seal 79 positioned the axle shaft 70 and through which the axle shaft 70 extends. Meanwhile, the third aperture has positioned therein the bearing 80 which supports the interior end 70b of the axle shaft 70, the retaining ring 82, and the seal 84 which is adapted to cover the interior end 70b of the axle shaft 70.

As described above, the use of the reversibly positionable axle shaft 70 allows a single axle shaft to be used for either left handed or right handed drive. For this purpose, the gear teeth 74 of the axle shaft 70 are formed so as to extend along the substantial length of that portion of the axle shaft 70 which is positioned within the mechanical chamber 46 of the main casing section 12. In this manner, the teeth 74 of the axle shaft 70 are ensured of being able to matingly engage with the gear teeth 72 of the bull gear 68 when the axle shaft 70 is positioned in either drive configuration. While the gear teeth 74 are illustrated as extending continuously along this length, it will be understood that other arrangements of the gear teeth are contemplated so long as the axle shaft 70 is capable of being driven by the bull gear 68 when utilized in either drive configuration.

Figure 7:
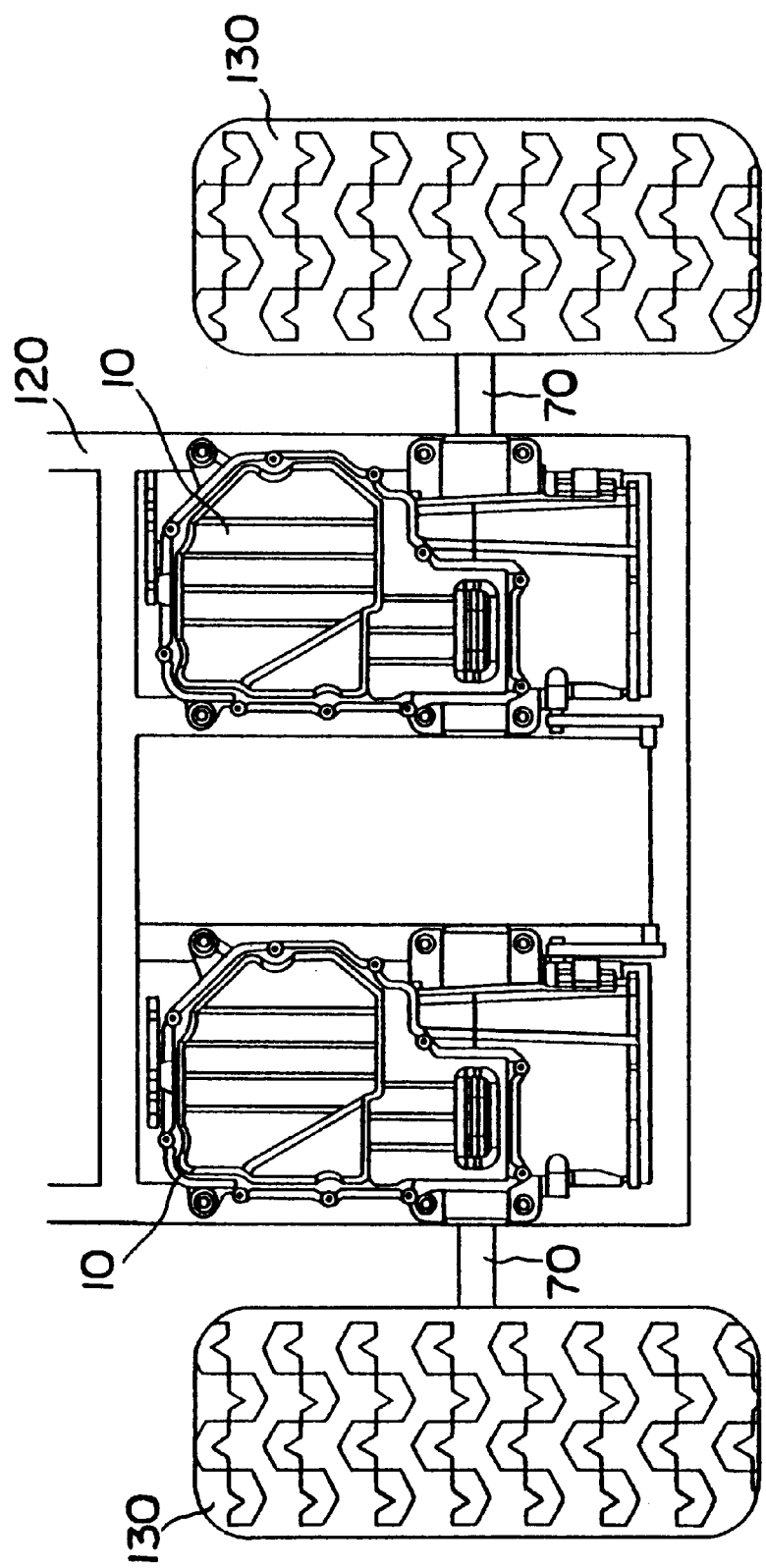
FIG. 7 illustrates a bottom, sectional view of a vehicle having an IHT constructed in accordance with the subject invention inserted thereon.

The use of such a transaxle 10 in a vehicle is depicted in FIG. 7, where it can be seen that identical housing units can be used for both transaxles 10, both of which are secured to vehicle frame 120 and drive axles 70 to power wheels 130.

The transaxle 10 includes advantageous arrangements of axles and shafts. For example, FIGS. 1 and 4 show the motor shaft 38 perpendicular to the axle shaft 70. FIG. 1 also show the input shaft 36 perpendicular to both the motor shaft 38 and the axle shaft 70. FIG. 2 shows the brake shaft 52 parallel to the axle shaft 70. Accordingly, the brake shaft 52 is perpendicular to both the motor shaft 38 and the input shaft 36. Other advantageous arrangements will be apparent from the teachings herein.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A transaxle comprising:
   a casing having a first and second oppositely disposed apertures;
   an axle shaft having a first end and a second end, the axle shaft being positionable in either a first position or second position within the casing wherein the second end of the axle shaft extends through and is supported in the first aperture and the first end of the axle shaft is supported in the second aperture when the axle shaft is in the first position and wherein the first end of the axle shaft is supported in the first aperture and the second end of the axle shaft extends through and is supported in the second aperture when the axle shaft is in the second position;
   a first seal having an opening through which the axle shaft passes, the first seal being disposed in the first aperture when the axle shaft is in the first position and disposed in the second aperture when the axle shaft is in the second position; and
   a second seal that fills the second aperture when the axle shaft is in the first position and that fills the first aperture when the axle shaft is in the second position.

2. The transaxle of claim 1, wherein the axle shaft is placed in the first position to achieve a right-handed drive and the axle shaft is placed in the second position to achieve a left-handed drive.

3. The transaxle of claim 1, comprising a first ring gear and wherein the first end of the axle shaft includes a second gear adapted to engage the first gear when the axle shaft is in either the first position or the second position.

4. The transaxle of claim 3, further comprising a brake shaft drivingly connected to the axle shaft.

5. The transaxle of claim 4, wherein the brake shaft is parallel to the axle shaft.

6. The transaxle of claim 4, wherein the brake shaft includes gear teeth drivingly connected to the first gear.

7. The transaxle of claim 6, further comprising first and second bevel gears drivingly connected to the brake shaft.

8. The transaxle of claim 7, wherein the second bevel gear comprises an inner portion having gear teeth mating with the brake shaft gear teeth.

9. The transaxle of claim 4, comprising a motor shaft drivingly connected to the brake shaft.

10. The transaxle of claim 9, comprising first and second bevel gears drivingly connecting the motor shaft to the brake shaft.

11. The transaxle of claim 3, wherein the first gear is floatingly positioned over the first end of the axle shaft.

12. A transaxle comprising:
    a casing have a first and second oppositely disposed apertures;
    a driving gear disposed within the casing; and
    an axle shaft having an elongated section that engages with the driving gear and an end portion adapted to have a wheel mounted thereon, such that the end portion of the axle shaft extends through the first aperture and a first portion of the elongated section, proximate to the end portion of the axle shaft, engages the driving gear when the axle shaft is placed in a first position within the casing and the end portion of the axle shaft extends through the second aperture and a second portion of the elongated section, distinct from the first portion of the elongated section and removed from the end portion of the axle shaft, engages the drive gear when the axle shaft is placed in a second position within the casing.

13. The transaxle of claim 12, wherein the drive gear comprises a bull gear.

14. The transaxle of claim 13, wherein the elongated section of the axle shaft comprises gear teeth integrally formed thereon adapted to matingly engaging the bull gear.

15. The transaxle of claim 14, wherein the elongated section of the axle shaft extends substantially along the width of the casing.

16. The transaxle of claim 13, comprising a hydrostatic transmission housed in the casing and adapted to drive the bull gear.

17. The transaxle of claim 16, wherein the hydrostatic transmission comprises:

a center section including hydraulic porting;

a hydraulic pump motor mounted on center section; and a hydraulic motor mounted on the center section, wherein the hydraulic pump is hydraulically connected to the hydraulic motor through the hydraulic porting to form a hydraulic circuit.

18. A transaxle comprising:

a casing having a first aperture and a second aperture disposed on opposite sides of the casing;

a transmission mounted in the casing;

an axle shaft having a first end, the axle shaft being positionable in either a first or second position within the casing such that the axle shaft extends through the first aperture and the first end of the axle shaft is supported in the second aperture when the axle shaft is in the first position and the axle shaft extends through the second aperture and the first end of the axle shaft is supported in the first aperture when the axle shaft is in the second position; and a gear associated with the transmission that engages the axle shaft when the axle shaft is in either the first position or the second position wherein the gear engages the axle shaft at a first location along the length of the axle shaft when the axle shaft is in the first position and at second location along the length of the axle shaft, distinct from the first location, when the axle shaft is in the second position.

19. The transaxle of claim 18, wherein the transmission comprises a hydrostatic transmission.

20. The transaxle of claim 19, wherein the hydrostatic transmission comprises:

a center section including hydraulic porting;

a hydraulic pump motor mounted on the center section; and a hydraulic motor mounted on the center section, wherein the hydraulic pump is hydraulically connected to the hydraulic motor through the hydraulic porting to form a hydraulic circuit.

21. A transaxle comprising:

a casing having a first and second oppositely disposed apertures;

an axle shaft having a first end and a second end, the axle shaft being positionable in either a first or second position within the casing wherein the second end of the axle shaft extends through and is supported in the first aperture and the first end of the axle shaft is supported in the second aperture when the axle shaft is in the first position and wherein the first end of the axle shaft is supported in the first aperture and the second end of the axle shaft extends through and is supported in the second aperture when the axle shaft is in the second position; and a brake shaft drivingly connected to the axle shaft.

\* \* \* \* \*